Patented Nov. 10, 1942

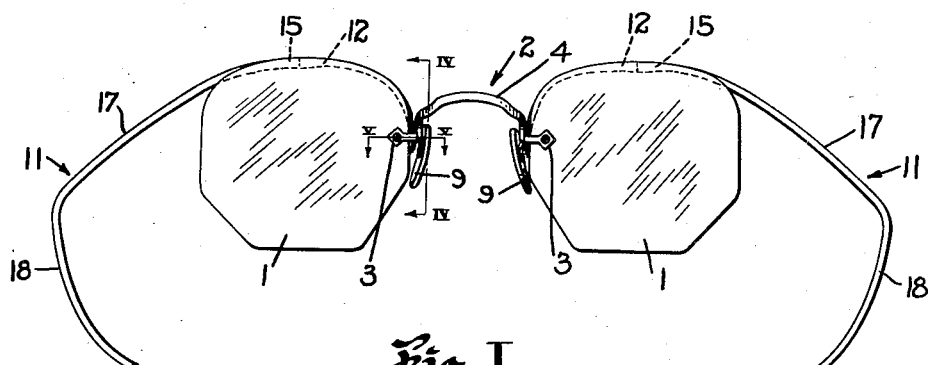
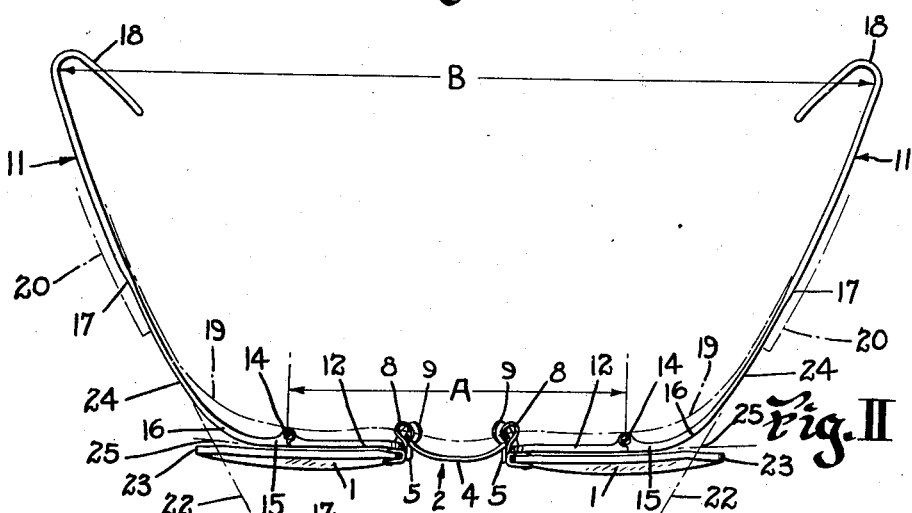
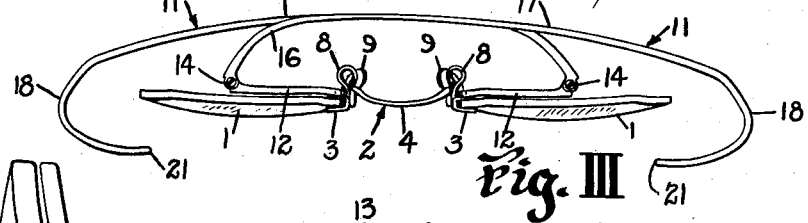
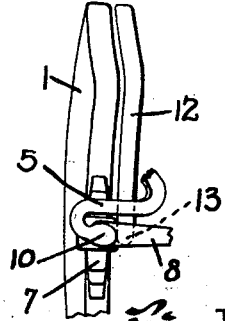
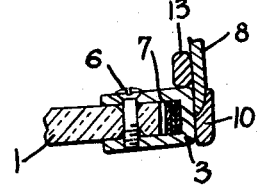
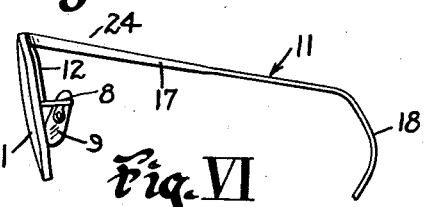

2,301,325

UNITED STATES PATENT OFFICE 2,301,325

OPHTHALMIC MOUNTING

Jacob C. Reiss, Newark, and Norman A. Snedeker, Irvington, N. J.

Application January 20, 1940, Serial No. 314,832

4 Claims. (Cl. 88—41)

This invention relates to improvements in ophthalmic mountings and has particular reference to novel means and method of making the same.

One of the principal objects of the invention is to provide a novel type of ophthalmic mounting and method of making the same adaptable for use primarily by individuals wearing headdresses similar to that worn by nuns, etc., whereby the supporting structure for the lenses will have a relatively close fit with the face of the wearer so that the temples may be extended beneath the headdress at the sides of the head without disturbing the set of said headdress and without requiring abnormal distortion of the parts of the supporting structure and which will be particularly desirable from the aesthetical and optical viewpoint.

Another object is to provide a durable construction of the above character whereby a mounting having the desirable characteristics of a rimless type mounting is provided with the supporting strain of the mounting removed from the lenses to, in effect, produce the desired rigidity and durability of a frame type mounting and yet provide a mounting in which the supporting structure for the lenses will be substantially invisible and inconspicuous when the mounting is on the face and enable the said mounting to be worn by individuals wearing headdresses such as set forth above.

Another object is to provide an ophthalmic mounting having temple supports extending outwardly about the upper edges of the lenses to a point substantially midway of said lenses and terminating in a temple connection at said location, in combination with temples pivotally attached at said temple connections and having adjacent end portions which, when the temples are extended, lie substantially in line with the adjacent portion of said temple supports and thence curve rearwardly with a relatively long sweeping arc to temple side portions.

Another object is to provide temple side portions which are disposed at such an angle relative to the lenses that the said side portions diverge outwardly so as to greatly increase the distance between the ear or head engaging ends of the temples, as compared with the distance between the pivotal connections of the respective temples with the temple supports.

Another object is to so control distance between the pivotal connections of said temples so that said distance will be less than half the distance between the ear or head engaging end portions of the temples.

Another object is to provide an ophthalmic mounting of the character described with temple supports and temples pivotally connected with said supports and so related with the lenses that the temples curve outwardly and rearwardly from a point adjacent the vertical center lines of the lenses substantially in a single plane so as to cause the temple to appear as extending rearwardly along a straight line when the mounting is viewed from the side from a point adjacent the upper edge of the lenses.

Other objects and advantages of the invention will become apparent from the following description taken in connection with the accompanying drawing and it will be apparent that many changes may be made in the details of construction, arrangement of parts and steps of the process shown and described without departing from the spirit of the invention as expressed in the accompanying claims. We, therefore, do not wish to be limited to the exact details shown and described as the preferred forms only have been given by way of illustration.

Referring to the drawing:

Fig. I is a front elevation of the mounting embodying the invention;

Fig. II is a plan view of the mounting illustrated in Fig. I with the temples extended;

Fig. III is a view generally similar to Fig. II with the temples folded;

Fig. IV is an enlarged fragmentary view taken as on line IV—IV of Fig. I;

Fig. V is an enlarged fragmentary sectional view taken as on line V—V of Fig. I; and Fig. VI is a reduced side elevation of the mounting embodying the invention.

Because of the nature of headdresses worn by nuns, etc., it has been quite difficult in the past to fit mountings of the usual prior art type to such individuals, particularly in instances where the headdress is provided with a portion in intimately fitted relation with the sides of the head.

The present invention therefore is directed particularly to the provision of a mounting which has its supporting portions closely related with the face, with the temples of the mounting so disposed that they may be fitted beneath the portions of the headdress at the sides of the face or head without disturbing or altering the fit of said headdress and to simultaneously provide a mounting which has the desirable characteristics of a rimless type mounting plus the desired strength and durability of a frame type mounting and which will provide an unobstructed field of vision through the lenses throughout the most useful area of said lenses throughout the sides and lower contour edges of said lenses.

Referring more particularly to the drawing wherein like characters of reference designate like parts throughout the several views the invention resides primarily in the provision of an ophthalmic mounting comprising a pair of lenses 1 secured to a bridge 2 by suitable lens straps or the like 3. The bridge 2 has a central arch portion 4 terminating in adjustable side portions 5 by means of which the distance between the lenses 1 may be altered to fit the requirements of the wearer. The lens straps 3 are secured to the lenses by a screw, solder lock connection or the like 6 to provide a pivotal connection with the lenses and the said straps 3 are limited in their pivotal movement on the lens by a plurality of leaf springs or the like 7. This provides shock absorbing means at the lens strap connection for relieving the lenses from shock and strain. The side portions 5 of the bridge are secured to the portion of the lens strap overlying the edge of the lens by soldering, welding or the like as illustrated at 10. Progressing rearwardly from adjacent the point of attachment of the side portions 5 of the bridge there is provided nose pad supporting arms 8 to which suitable nose bearing pads 9 are pivotally or rigidly attached. The said arms 8 are adjustable so as to alter the distance between the nose bearing pads 9 so as to permit the said pads to be adjusted to fit the nose of the wearer. To provide means for attachment of the temples 11 to the mounting there is provided relatively long and slender temple supports 12. These temple supports have an end 13 secured to the rear of the lens strap 3 or other nose pad supporting arm 8 or to both the arm 8 and the straps 3 as desired by soldering, welding or the like. The temple supports 12 are shaped to follow substantially the upper nasal side and adjacent top portions of the respective lenses and terminate in temple hinge connections 14 to which the temples 11 are pivotally attached. The said temple hinge connections are located substantially midway of the lenses or adjacent the vertical center lines of said lenses. The temple supports 12 are preferably shaped to follow the adjacent contour edges of the lenses in a plane in the rear of the plane of the lenses so as to be relatively inconspicuous and substantially invisible when the mounting is viewed from the front. It is to be understood, however, that the said temple supports 12 may be shaped to follow the adjacent contour edges of the lenses in the plane of said lenses or may be located in the front of the plane of said lenses as desired. The temples 11 each have an adjacent end portion 15 lying substantially in the line of the adjacent end portion of the temple supports 12 and thence turn rearwardly with a relatively long sweeping bend 16 to rearwardly and outwardly extending side portions 17. This arrangement is to dispose the side portions 17 in diverging relation with each other in a direction towards the head or ear engaging portion 18 of said temples.

The hinge connections 14 are located substantially midway of the lenses or adjacent the vertical center line of the lenses and the temples 11 curve rearwardly with a relatively long arcuate bend 16 so as to follow substantially the adjacent contour shape of the brow of the wearer as illustrated by the dot and dash lines 19. The dot and dash lines 19 diagrammatically illustrate the contour shape of the forehead and sides of the head along which the temple supports 12 and temples 11 extend when in position of use. The temples and upper portions of the temple supports are so located adjacent the brow of the individual as to follow substantially the shape of the brow and to have the side portions 17 shaped approximately to and to lie in relatively intimate relation with the sides of the head. While the temples and temple supports are shaped substantially to the contour shape of the brow and sides of the head they are also shaped adjacent the lenses to follow substantially the shape of the upper contour edges of said lenses directly in the rear of the upper edges of the lenses. The purpose of having the sides 17 diverge outwardly along a relatively strong angle relative to each other is to provide, as stated above, a relatively intimate fit with the sides of the head and also enable the temples to be tucked and fitted to the side portions 20 of the headdress which overlies the sides of the head and face particularly the headdress worn by nuns, etc. These portions 17 are curved substantially to the curvature of the sides of the head so as to intimately fit with the sides of the head and allow the portions 20 to assume a desired comfortably fitted relation with the sides of the head. The curvature of the side portions 17 is altered according to the curvature of the side of the face of the particular individual for whom the mounting is being formed, particularly along the temporal sides of the head which the side portions 17 overlie during the use of the mounting. The relatively long arc of curvature of the side portion 17 and portion 16 when curved along a shorter radius lies substantially in a single plane when the temples are viewed from the side as illustrated in Fig. VI so that the temples appear to progress downwardly at an angle to the plane of the lenses substantially from the hinge connections 14 apparently along a substantially straight line. The end portions 15 and the adjacent portions of the temple supports 12 have upper and lower contour edges shaped to lie substantially in flush relation with each other when the temples 11 are extended and have adjacent side surfaces also located in substantially flush relation with each other so as to have adjacent outer surfaces also made to lie in flush relation with each other when the temples are extended so as to produce a continuous blended unbroken appearance.

The mounting is so formed that when the temple sides 17 are extended, as illustrated in Fig. II, the distance A between the hinge connections 14 with the temple supports 12 is less than half the distance B between the head or ear engaging portions of the temples.

Another distinction of the present mounting is that when the temples are folded, as illustrated in Fig. III, the distance A between the temple hinge connections 14 with the arms 12 is less than the distance between the tips 21 of the temples. The relations are set forth to more clearly define the construction of applicants' mounting.

The sides 17 of the temples when extended, as illustrated in Fig. II, lie substantially along lines 22 which intersect the plane of the lenses within the limits of the outer edge portion 23 of said lenses and intersect each other in front of said lenses at a point located at a distance from the lenses less than the distance between the outer edges 23 of the lenses of the mounting. The ends 15 of the temples 11 taper from the hinge connection portions 14 into a side portion 17 of said temples. The said side portions 17, when viewed from the top, are relatively thin, as illustrated at 24, so as to provide resiliency throughout said reduced portion 24. The portions 15 are considerably built up and are relatively rigid as compared with the portions 24. The portions 24 when viewed from the side, as illustrated in Fig. VI, have upper and lower edges which taper gradually from adjacent the hinge connection end 15 toward the head or ear engaging end 18. The portions 15 and side portions 17, through the provision of the arcuate portions 16, extend along lines which are at a decided angular relation with each other and which intersect each other as diagrammatically illustrated at 25. The said points of intersection lie within the limits of the outer side edges 23 of the lenses.

The mounting is made, assembled and fitted to the wearer substantially as follows:

The lenses 1 are formed to the required prescriptive power, contour shape and size. Suitable connection openings for the connecting means 6 are formed in the lenses. Temples 11, of the required length, are secured to the temple supports 12. The said temples are curved along the arc 16 to dispose the side portions 17 in diverging relation with each other. The angle of divergence is such as to initially relate the temples so as to fit approximately the shape of the size of the head. The lenses are then assembled with the lens straps 3. The temple supports 12 are shaped to follow substantially the adjacent contour edge shape of the lenses preferably in a plane in the rear of the plane of the lenses and to lie in adjacent relation with the adjacent rear surfaces of the lenses. The temples are so curved as to provide portions 15 lying substantially in the line of the adjacent portions 12 with the said curved portions 16 curving rearwardly within the limits of the outer edges 23 of the lenses. The bridge 2 and nose pad supporting arms 8 are adjusted to fit the bridge to the nose of the wearer and to position the lenses in desired spaced aligned relation with each other. The arc 16 of the temples are then altered to dispose the sides 17 to the proper angular relation with each other and the said side portions 17 are simultaneously adjusted so as to assume a relatively intimate fit with the sides of the head and to fit in snug relation with the sides of the head beneath the side portions 20 of the headdress of the wearer, particularly when worn by nuns, etc. Slight adjustments are made to fit the particular facial characteristics of the wearer and to locate the parts in desired positional relation with each other and yet insure that the mounting fits comfortably on the face of the wearer.

Although such mountings are designed particularly for nuns or other individuals wearing headdresses similar to nuns, said mounting may be worn by any individual desiring the same. The construction of the mounting is such that the lenses will have the desirable unobstructed field of vision of rimless type mountings and will be supported relatively free from strain which might be introduced by the flexing of the temples when the mounting is positioned on or removed from the face. It is to be understood that the central arch portion may be formed of rigid or resilient material or may have portions thereof possessing one or more of said characteristics. It is also to be understood that if desired the entire length of the temples may be of relatively rigid material with the said temple supports having a similar rigidity, particularly in instances when a bridge having a resilient arch portion 4 is used. In all instances, it is particularly desirable to have the temple supporting portions 12 formed of relatively rigid material so that the said supports 12 may be adjusted and will tend to retain their adjusted positions during the use of the mounting. The resilient portions 24 are provided so as to relieve distortional strain from the portions 12 and also from the bridge in instances when it is desired that the bridge be formed of rigid material. It is also to be understood that the bridge 2 and temples may be both provided with a controlled degree of resiliency. It is apparent that any strain which might be introduced by bending or flexing the temples will be directed through the temple supports 12 to the bridge 2 so that no strain is imparted to the lenses. The fact that the lenses are pivotally attached to the lens straps 3 and the said straps are provided with resilient means 7 for limiting said pivotal movement insures that the said lenses are resiliently supported against shock and strain during use.

From the foregoing description it will be seen that simple, efficient and economical means and methods have been provided for accomplishing all of the objects and advantages of the invention.

Having described our invention, we claim:

1. A supporting structure for the lenses of an ophthalmic mounting comprising a bridge having lens holding means for connection with said lenses, adjustable temple supporting arms secured to the supporting structure adjacent the lens holding means and shaped to follow the contour edges of the upper nasal sides of the lenses when in position thereon and terminating in pivotal temple connections adapted to be located substantially midway of the lenses adjacent the vertical center lines of the lenses and temples pivotally connected to said temple supports adjacent the front ends of said temples and having head engaging portions adjacent their opposed ends, said temples, when extended, having a distance between the head engaging portions thereof greater than twice the distance between the pivotal temple connections of said supports and having a portion extending outwardly from the pivotal connection and lying substantially in line with the longitudinal center line of the upper portion of the temple supports and shaped to follow the adjacent upper contour edge portions of said lenses and relatively long and rearwardly extending side portions joined with said outwardly extending portions which lie substantially in line with the upper portion of the temple supports by a curved section, with said relatively long side portions terminating in head engaging end portions, said relatively long rearwardly extending side portions, when extended, being disposed at such an angular relation with each other that lines following said side portions will intersect each other at a distance in front of the lenses less than the distance between the outer edges of the lenses when said lenses are in connected relation with the lens holding means.

2. An ophthalmic mounting comprising a pair of lenses and a supporting structure for the lenses, said supporting structure comprising a bridge having lens holding means connected with said lenses, adjustable temple supporting arms secured to the supporting structure adjacent the lens holding means and shaped to follow the contour edges of the upper nasal sides of the lenses and terminating in pivotal temple connections adapted to be located substantially midway of the lenses adjacent the vertical center lines of said lenses and temples pivotally connected to said temple supports adjacent the front ends of said temples and having head engaging portions adjacent their opposed ends, said temples, when extended, having a distance between the head engaging portions thereof greater than twice the distance between the pivotal temple connections of said supports and having a portion extending outwardly from the pivotal connection and lying substantially in line with the longitudinal center line of the upper portion of the temple supports and shaped to follow the adjacent upper contour edges of said lenses and relatively long rearwardly extending side portions joined with said outwardly extending portions which lie substantially in line with the upper portion of the temple supports by a curved section, with said relatively long side portions terminating in head engaging end portions, said relatively long, rearwardly extending side portions, when extended, being disposed at such an angular relation with each other that lines following said side portions will intersect each other at a distance in front of the lenses less than the distance between the outer edges of the lenses.

3. A supporting structure for the lenses of an ophthalmic mounting comprising a bridge having lens holding means for connection with said lenses, adjustable temple supporting arms secured to the supporting structure adjacent the lens holding means and shaped to follow the contour edges of the upper nasal sides of the lenses when in position thereon and terminating in pivotal temple connections lying within the limits of the widths of the upper edges of the lenses and temples pivotally connected to said temple supports adjacent the front ends of said temples and having head engaging portions adjacent their opposed ends, said temples, when extended, having a distance between the head engaging portions thereof greater than twice the distance between the pivotal temple connections of said supports and having a portion extending outwardly from the pivotal connection and lying substantially in line with the longitudinal center line of the upper portion of the temple supports and shaped to follow the adjacent upper contour edge portions of the lenses and relatively long and rearwardly extending side portions joined with said outwardly extending portions which lie substantially in line with the upper portions of the temple supports by a curved section, with said relatively long side portions terminating in head engaging end portions, said relatively long rearwardly extending side portions, when extended, being disposed at such an angular relation with each other that lines following said side portions will intersect each other at a distance in front of the lenses less than the distance between the outer edges of the lenses when said lenses are in connected relation with the lens holding means.

4. An ophthalmic mounting comprising a pair of lenses and a supporting structure for said lenses, said supporting structure comprising a bridge having lens holding means connected with said lenses, adjustable temple supporting arms secured to the supporting structure adjacent the lens holding means and shaped substantially to follow the contour edges of the upper nasal sides of the lenses and terminating in pivotal temple connections lying within the limits of the widths of the upper edges of the lenses and temples pivotally connected to said temple supports adjacent the front ends of said temples and having head engaging portions adjacent their opposed ends, said temples, when extended, having a distance between the head engaging portions thereof greater than twice the distance between the pivotal temple connections of said supports and having a portion extending outwardly from the pivotal connection and lying substantially in line with the longitudinal center line of the upper portion of the temple supports and shaped to substantially follow the adjacent upper contour edge portions of the lenses and relatively long and rearwardly extending side portions joined with said outwardly extending portions which lie substantially in line with the upper portions of the temple supports by a curved section, with said relatively long side portions terminating in head engaging end portions, said relatively long rearwardly extending side portions, when extended, being disposed at such an angular relation with each other that lines following said side portions will intersect each other at a distance in front of the lenses less than the distance between the outer edges of the lenses.

JACOB C. REISS.
NORMAN A. SNEDEKER.